(12) United States Patent
Stoffels et al.

(10) Patent No.: US 8,584,798 B2
(45) Date of Patent: Nov. 19, 2013

(54) SAFETY APPARATUS FOR ARRESTING A FALL OF A WORKER

(75) Inventors: Richard B. Stoffels, Eden Prairie, MN (US); James G. Sidla, Monticello, MN (US)

(73) Assignee: Garlock Safety Systems Inc., Minneapolis, MN (US)

( * ) Notice: Subject to any disclaimer, the term of this patent is extended or adjusted under 35 U.S.C. 154(b) by 462 days.

(21) Appl. No.: 12/797,879

(22) Filed: Jun. 10, 2010

(65) Prior Publication Data

US 2011/0303484 A1 Dec. 15, 2011

(51) Int. Cl.
*A62B 35/00* (2006.01)

(52) U.S. Cl.
USPC .................................. 182/3; 182/45

(58) Field of Classification Search
USPC ................ 182/45, 3; 482/45, 15; 52/155–166
See application file for complete search history.

(56) References Cited

U.S. PATENT DOCUMENTS

| | | | |
|---|---|---|---|
| 742,279 A | 10/1903 | Bearse | 52/162 |
| 1,676,197 A * | 7/1928 | Marrinan | 52/156 |
| 1,982,963 A * | 12/1934 | Post | 52/162 |
| 2,707,585 A | 5/1955 | Hoey | |
| 3,003,579 A | 10/1961 | Weiss | |
| 3,747,552 A | 7/1973 | Rhodes | 114/295 |
| 3,759,346 A * | 9/1973 | Brda | 182/7 |
| 4,144,843 A * | 3/1979 | Schrougham | 119/786 |
| 4,174,021 A | 11/1979 | Barlock | 182/17 |
| 4,213,624 A * | 7/1980 | Sanders | 280/43.12 |
| 4,274,507 A | 6/1981 | Williams | 182/12 |
| 4,315,387 A * | 2/1982 | Lee et al. | 52/156 |
| 4,440,261 A * | 4/1984 | Clark | 182/3 |
| 4,458,617 A | 7/1984 | Eden | 114/39.16 |
| 4,496,027 A | 1/1985 | Fisher | 182/142 |
| 4,512,438 A * | 4/1985 | Vilchek et al. | 182/43 |
| 4,607,724 A | 8/1986 | Hillberg | 182/3 |
| 4,703,831 A * | 11/1987 | Forrest et al. | 182/3 |
| 4,799,840 A | 1/1989 | Van Gompel et al. | 410/42 |
| 4,801,228 A | 1/1989 | Van Gompel | 410/94 |

(Continued)

FOREIGN PATENT DOCUMENTS

| | | |
|---|---|---|
| WO | WO2004/028326 A1 | 4/2004 |
| WO | WO2004/103473 A1 | 12/2004 |

*Primary Examiner* — Katherine Mitchell
*Assistant Examiner* — Candace L Bradford
(74) *Attorney, Agent, or Firm* — Alan Kamrath; Kamrath IP Lawfirm PA

(57) ABSTRACT

A safety apparatus (10) includes a frame unit (12) placed on a surface (102). A cable (62) is mounted around a pulley (60) rotatably mounted to the frame unit (12) about a rotation axis (58). A slide (90) is slideably mounted to the frame unit (12) along a slide axis (92) at a non-parallel angle to the rotation axis (58) and movable between upper and lower positions. The cable (62) is attached between the slide (90) and a worker (100) on the surface (102). A biasing member (110) is mounted between the slide (90) and the frame unit (12) and biases the slide (90) from the lower position to the upper position. An engaging member (120) is mounted to the slide (90) to move therewith. The engaging member (120) is above the surface (102) when the slide (90) is in the upper position. If the worker (100) falls from the surface, the engaging member (120) is moved downward and grips the surface (102) under the action of force resulting from falling of the worker (100) to retain the safety apparatus (10) on the surface and, thus, arrests the fall of the worker (100) from the surface (102).

17 Claims, 9 Drawing Sheets

(56) References Cited

U.S. PATENT DOCUMENTS

| | | | |
|---|---|---|---|
| 4,817,758 A | 4/1989 | Gilmore | 182/16 |
| 4,838,439 A * | 6/1989 | Baziuk | 212/179 |
| 5,004,072 A | 4/1991 | Launer | 182/45 |
| 5,065,838 A | 11/1991 | Finley | 182/38 |
| 5,135,078 A | 8/1992 | Bell | 182/142 |
| 5,287,943 A | 2/1994 | Bell | 182/3 |
| 5,328,192 A | 7/1994 | Thompson | 280/47.24 |
| 5,337,856 A | 8/1994 | Fillers | 182/107 |
| 5,370,203 A | 12/1994 | Kiska | 182/111 |
| 5,476,282 A | 12/1995 | Dahl | 280/651 |
| 5,820,143 A | 10/1998 | Rigo | 280/47.19 |
| 5,979,601 A * | 11/1999 | Lu | 182/82 |
| 6,019,330 A * | 2/2000 | Affrunti | 248/237 |
| 6,227,553 B1 * | 5/2001 | Palmer | 280/47.18 |
| 6,401,863 B1 * | 6/2002 | Kirkland | 182/142 |
| 6,412,230 B1 * | 7/2002 | Zambelli et al. | 52/27 |
| 6,880,838 B2 | 4/2005 | Hjorth | 280/79.2 |
| 7,032,710 B2 | 4/2006 | Anderson et al. | 182/16 |
| 7,207,414 B2 | 4/2007 | Luke et al. | 182/3 |
| 8,240,431 B2 * | 8/2012 | Smith | 182/3 |
| 2004/0055818 A1 | 3/2004 | Fulton et al. | 182/3 |
| 2004/0195041 A1 | 10/2004 | Vetesnik | 182/3 |
| 2005/0169735 A1 | 8/2005 | Pelsue | 414/469 |
| 2006/0107605 A1 * | 5/2006 | Krahn | 52/155 |
| 2007/0289811 A1 * | 12/2007 | Smith | 182/3 |
| 2009/0321184 A1 * | 12/2009 | Hamilton | 182/3 |
| 2010/0300017 A1 * | 12/2010 | Bulloch | 52/157 |

* cited by examiner

SAFETY APPARATUS FOR ARRESTING A FALL OF A WORKER

BACKGROUND OF THE INVENTION

The present invention relates to a safety apparatus for arresting a fall of a worker and, more particularly, to a safety apparatus for arresting a fall of a worker from a surface.

A safety apparatus should generally be provided to protect and allow free movement of a worker on a surface such as a flat roof surface, an upper story of a multi-story building being constructed, or the ground adjacent a precipice. The safety apparatus includes an engaging member for gripping the surface. A harness is attached between the worker and the safety apparatus. The engaging member of the safety apparatus grips the surface if the worker falls from the surface under the action of the force resulting from falling of the worker and transmitted to the engaging member via the harness. In an approach, the engaging member pivots about a pivot axis and grips the surface under the action of the force. However, the penetration depth of the engaging member can be an issue, leading to insufficient gripping force and risking movement of the safety apparatus. Furthermore, the safety apparatus and other equipment can be hoisted by a crane or the like to the surface such as a roof. Conventional safety apparatuses include a plurality of inverted U-shaped attachment elements to which hooks of the crane are engaged. However, the hooks are liable to unhook through the bottom opening of the inverted U-shaped attachment elements if the hook lines become slack.

Thus, needs exist for a safety apparatus that can reliably arrest falling of workers from a surface and/or that can avoid unhooking while hoisting the apparatus to the surface.

BRIEF SUMMARY OF THE INVENTION

The present invention solves these needs and other problems in the field of safety of workers working on an elevated surface by providing, in a preferred aspect, a safety apparatus including a frame unit adapted to be placed on the surface. A pulley is rotatably mounted to the frame unit about a rotation axis spaced from the surface. A cable is mounted around the pulley and includes first and second ends. The second end of the cable is adapted to be connected to the worker. The pulley is located intermediate the first and second ends of the cable. A slide is slideably mounted to the frame unit along a slide axis at a non-parallel angle to the rotation axis and movable between upper and lower positions. The first end of the cable is attached to the slide. Force resulting from a fall of a worker from the surface is transmitted to the slide via the cable. A biasing member is mounted between the slide and the frame unit and biases the slide from the lower position to the upper position. An engaging member is mounted to the slide to move therewith. The engaging member is above the surface when the slide is in the upper position. The engaging member grips the surface when the slide is in the lower position, preventing further falling of the worker.

In the most preferred form, an attachment member is connected to the second end of the cable, and a harness is connected between the attachment member and the worker. The biasing member includes a cylinder having a lower end fixed to the frame unit and an upper end fixed to the slide. The engaging member includes first and second spaced teeth each extending from the slide. Each of the first and second teeth is planar and at an acute angle relative to a base extending along the slide axis.

In a further preferred aspect, the present invention provides a lifting attachment for a frame unit adapted to be lifted on a surface. The lifting attachment includes an attach element having first and second sides spaced in a first direction. The attachment element further includes first and second edges extending between the first and second sides and spaced in a second direction perpendicular to the first direction. The attachment element further includes third and fourth edges extending between the first and second sides and between the first and second edges and spaced in a third direction perpendicular to the first and second directions. A first passage extends between the first and second sides in the first direction and extends from the first edge towards but spaced from the second edge in the second direction. The first passage is parallel to but spaced from the third and fourth edges in the third direction. A second passage extends between the first and second sides in the first direction and extends perpendicularly from the first passage towards but spaced from the third edge in the second direction. The second passage is parallel to but spaced from the first and second edges and spaced from the fourth edge. In the most preferred form, the attachment element is formed homogeneously from the same material and extends integrally between the first and second sides in the first direction, extends integrally between the first and second edges in the second direction and extends integrally between the third edge and the second passage in the third direction.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

Figure 1:
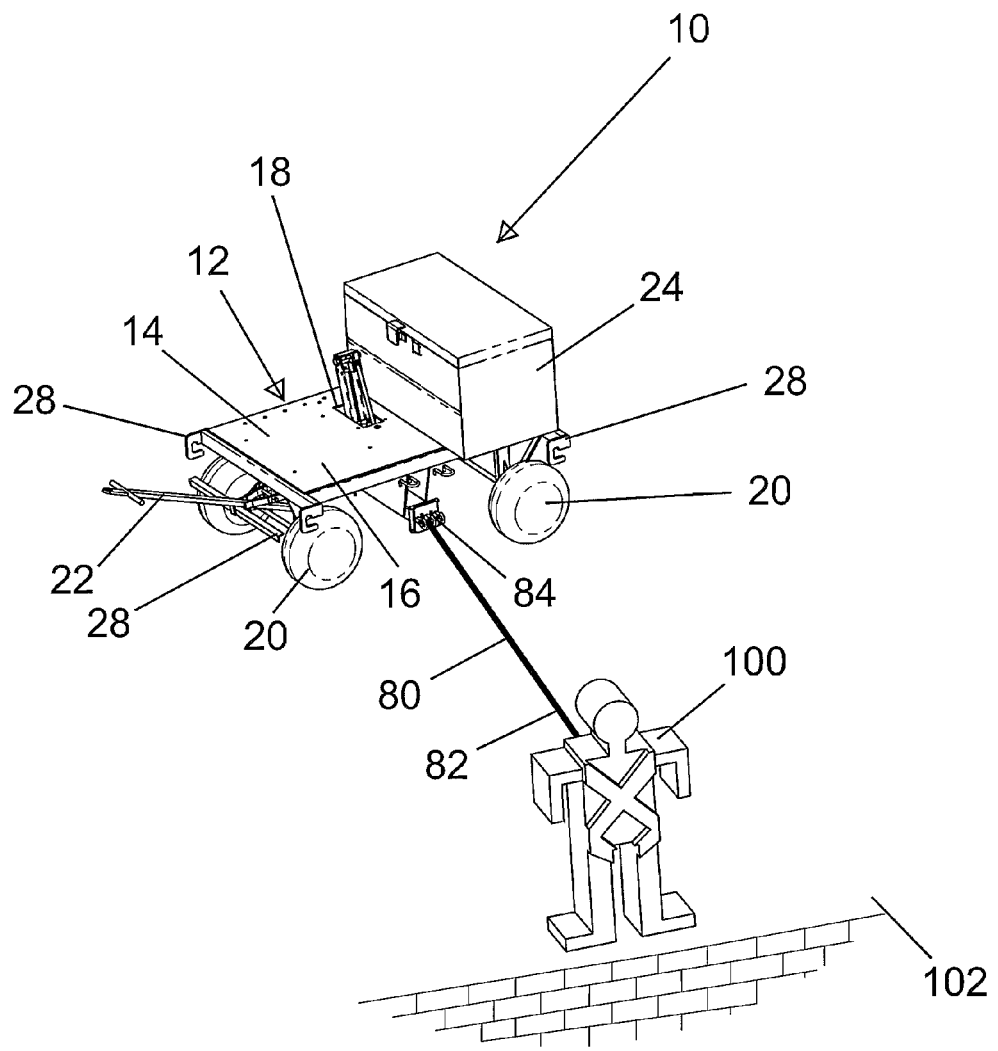
FIG. 1 shows a diagrammatic perspective view of a safety apparatus according to the preferred teachings of the present invention with a harness of the safety apparatus attached to a worker on a surface.
Figure 2:
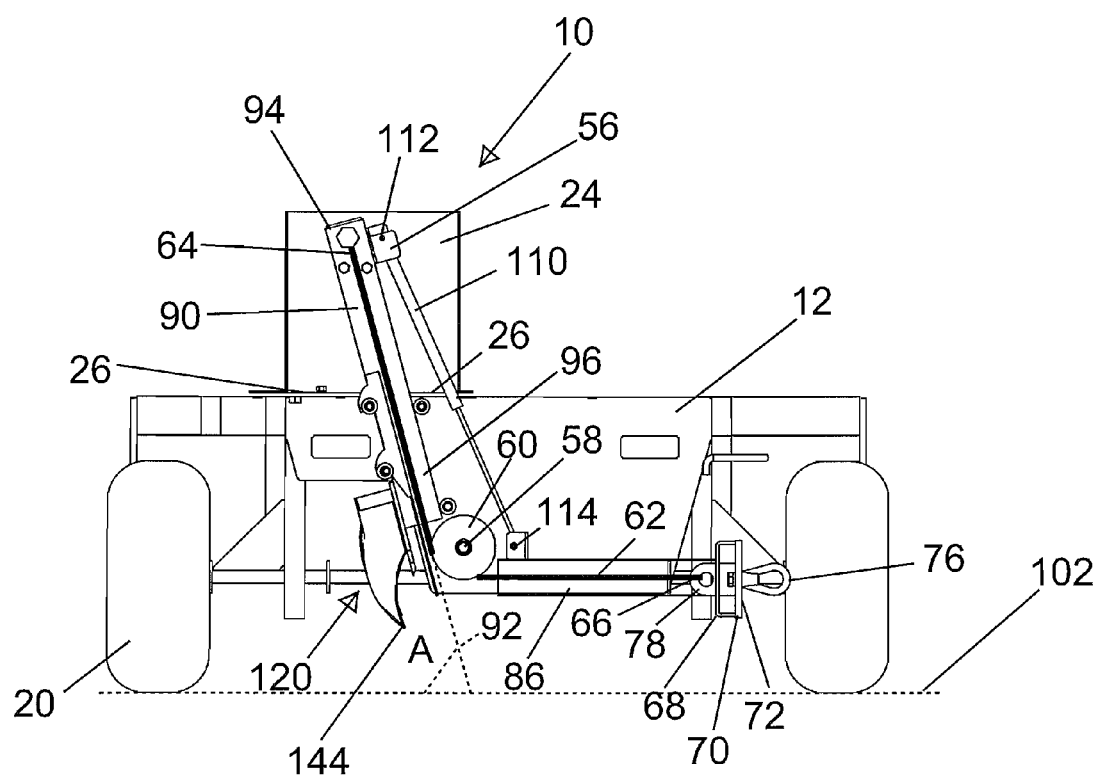
FIG. 2 shows a rear elevational view of safety apparatus of FIG. 1.
Figure 3:
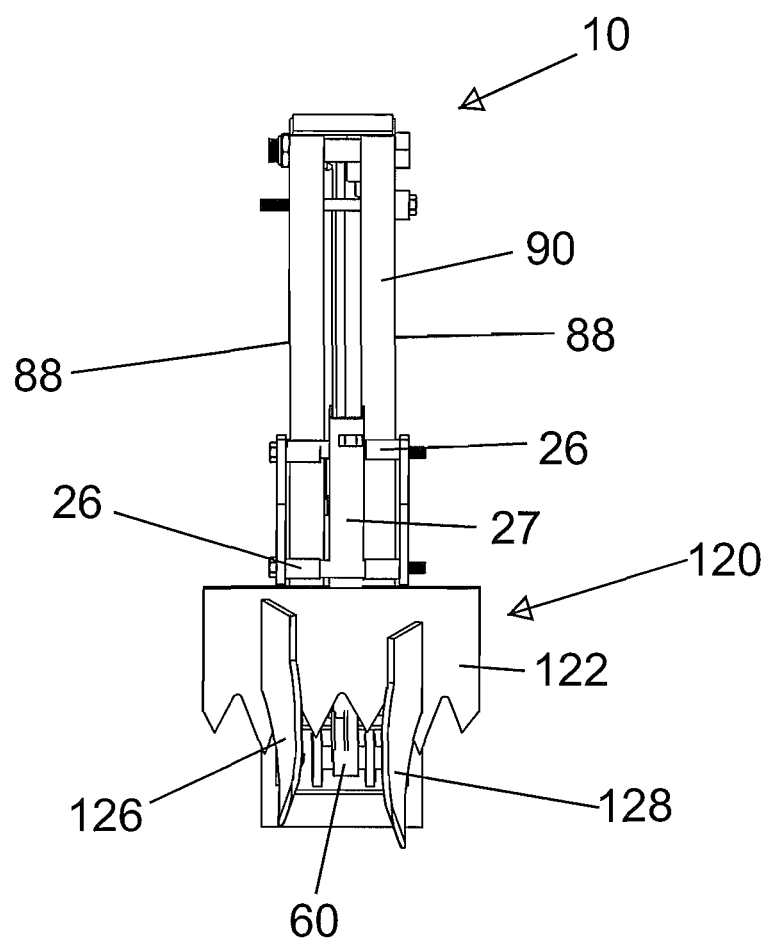
FIG. 3 shows an elevational view of a portion of the safety apparatus of FIG. 1.
Figure 4:
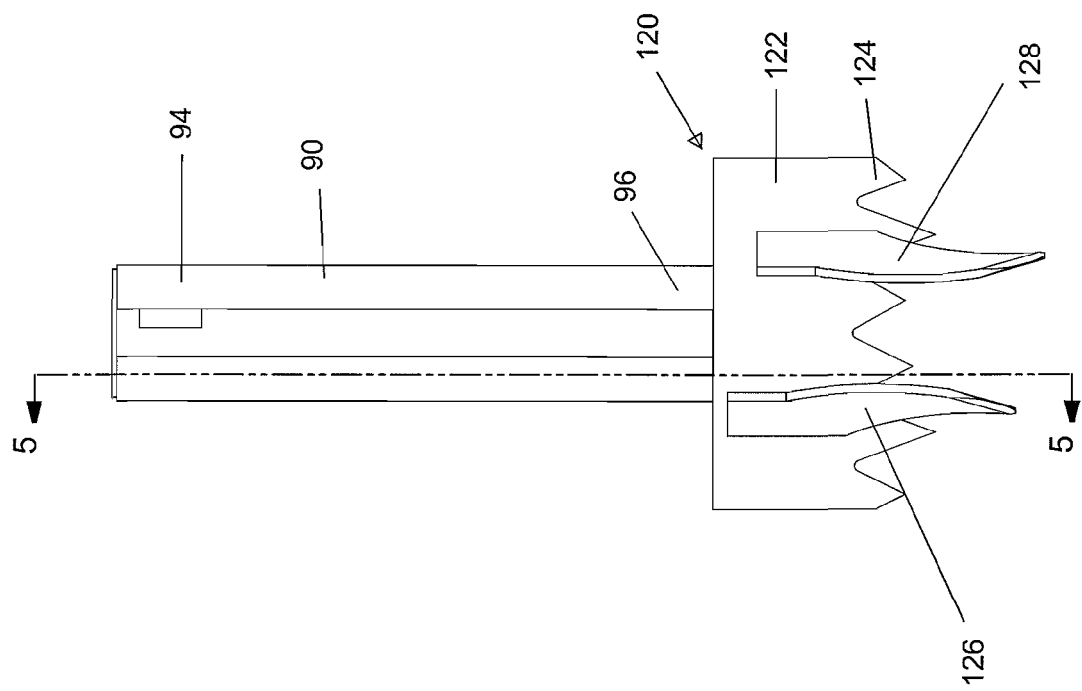
FIG. 4 shows an elevational view of a slide and an engaging member of the safety apparatus of FIG. 1.
Figure 5:
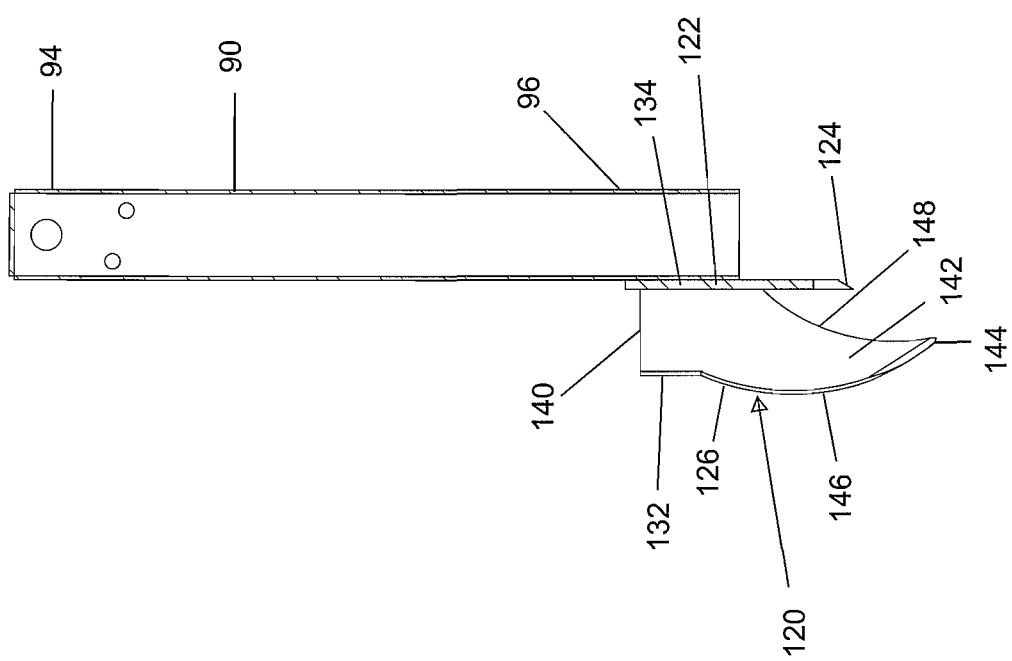
FIG. 5 shows a cross sectional view of the slide and engaging member of FIG. 4 according to section line 5-5 of FIG. 4.
Figure 6:
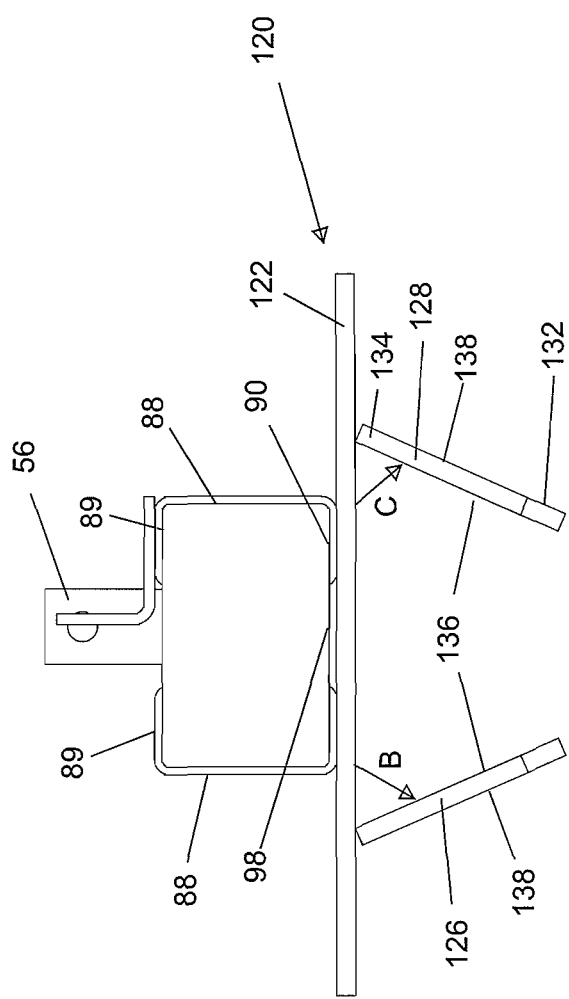
FIG. 6 shows a top view of the slide and engaging member of FIG. 4.
Figure 7:
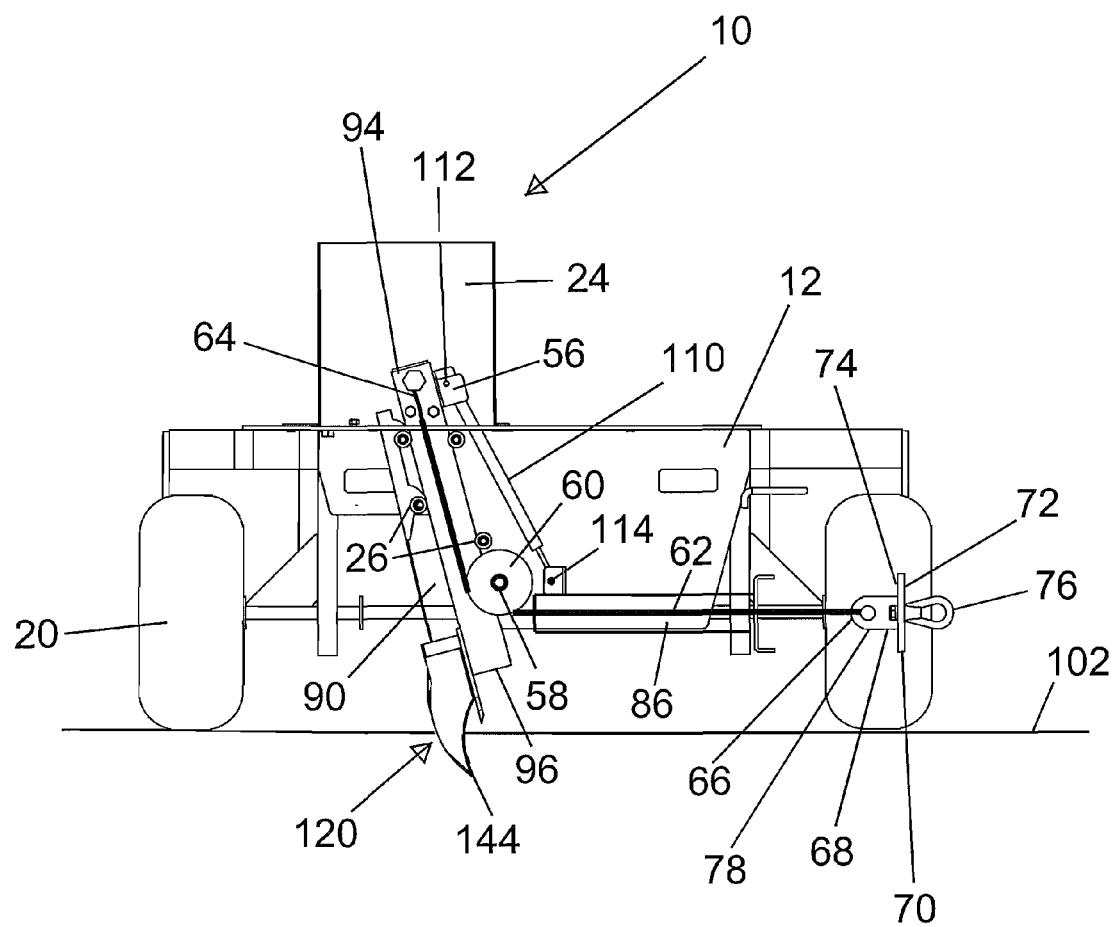
FIG. 7 shows a rear elevational view of the safety apparatus of FIG. 1 with the slide moved to a lower position.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "third", "fourth", "lower", "upper", "top", "bottom", "inner", "outer", "side", "end", "edge", "portion", "section", "horizontal", "vertical", "spacing", "length", "width", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

A safety apparatus for arresting a fall of a worker according to the preferred teachings of the present invention is shown in the drawings and generally designated 10. According to the preferred form shown, safety apparatus 10 is placed on an elevated surface 102. Surface 102 can be a flat roof surface, an upper story of a multi-story building being constructed, or the ground adjacent a well, a shaft, or the like. Safety apparatus 10 protects and allows free movement of a worker 100 on surface 102.

According to the preferred form shown, safety apparatus 10 includes a frame unit 12 adapted to be placed on surface 102. Frame unit 12 includes a frame 14 having a deck 16 movably supported above surface 102 by four wheels 20. Deck 16 includes upper and lower faces spaced in a vertical direction perpendicular to surface 102. A slot 18 extends from the upper face through the lower face of deck 16. A hitch 22 can be attached to a rear end of frame 14 such that frame unit 12 can be towed manually or by a tractor or the like on surface 102. If desired, wheels 20 can be replaced with skids or other forms of movement providing elements. Likewise, safety apparatus 10 can include a parking device to avoid movement of wheels 20 including but not limited to brakes for wheels 20. Hitch 22 can be of any desired form as conventional including but not limited to of a commercially available type. A utility box 24 can be mounted on top of frame 14 and can receive accessories required for protecting worker 100 as well as tools for repair or other purposes. Frame unit 12 further includes a plurality of rollers 26 rotatably mounted to frame 14 by brackets 27. It can be appreciated that rollers 26 can be of any desired form as conventional including but not limited to of a commercially available type and can be mounted to frame 14 by any suitable provision.

According to the preferred form shown, safety apparatus 10 further includes a plurality of lifting attachments 28 mounted to frame 14 to allow frame unit 12 to be lifted on surface 102 by a crane or the like. Although four lifting attachments 28 are shown at four corners of frame 14 in the preferred form, the number, location, and positioning of lifting attachments 28 can be varied according to the teachings of the present invention.

According to the preferred teachings of the present invention, each lifting attachment 28 includes an attach element 30 having first and second sides 32 and 34 spaced in a first direction. Attachment element 30 further includes first and second edges 36 and 38 extending between first and second sides 32 and 34 and spaced in a second direction perpendicular to the first direction. Attachment element 30 further includes third and fourth edges 40 and 42 extending between first and second sides 32 and 34 and between first and second edges 36 and 38 and spaced in a third direction perpendicular to first and second directions. A first passage 44 extends between first and second sides 32 and 34 in the first direction and extends from first edge 36 towards but spaced from second edge 38 in the second direction. First passage 44 is generally parallel but spaced from third and fourth edges 40 and 42 in the third direction. A second passage 46 extends between first and second sides 32 and 34 in the first direction and extends generally perpendicularly from first passage 44 towards but spaced from third edge 40 in the second direction. Second passage 46 is generally parallel to but spaced from first and second edges 36 and 38 and spaced from fourth edge 42. In the most preferred form shown, an extension 48 extends between first and second sides 32 and 34, extends from first passage 44 through fourth edge 42 in the third direction and extends from first edge 36 towards but spaced from second edge 38 in the second direction. Second passage 46 is intermediate extension 48 and second edge 38 in the second direction. Attachment element 30 is formed homogeneously from the same material and extends integrally between first and second sides 32 and 34 in the first direction, extends integrally between first and second edges 36 and 38 in the second direction and extends integrally between third edge 40 and second passage 46 in the third direction. Attachment element 30 thus formed includes a substantially L-shaped leg 50 having a vertical section 52 and a horizontal section 54 extending perpendicularly to vertical section 52. In the most preferred form shown, after attachment element 30 is mounted to frame 14, the first direction is a width direction of frame 14, the second direction is a length direction of frame 14, and the third direction is the vertical direction.

Frame unit 12 can be hoisted by a crane onto surface 102 through use of a plurality of hooks 108 each engaged in second passage 46 of one of attachment elements 30 and a plurality of cables 106 each connected between one of hooks 108 and a boom of the crane. Each hook 108 can be moved through first passage 44 of one of attachment elements 30 in the length direction of frame 14 until it is stopped by vertical section 52 of one of legs 50. Each hook 108 can then be moved upward in the vertical direction into second passage 46 of one of attachment elements 30. Horizontal section 54 of leg 50 guides hook 108 and prevents hook 108 from disengaging from first passage 44 while hook 108 is passing through first passage 44. Due to the shape of attachment elements 30 according to the teachings of the present invention, hooks 108 can be reliably guided into and retained in second passages 46 of attachments 30 without the risk of unintentional unhooking that often occurs in conventional inverted U-shaped attachment elements if one or more cable 106 becomes slack.

According to the preferred form shown, safety apparatus 10 further includes a pulley 60 rotatably mounted to frame unit 12 about a rotation axis 58 spaced from surface 102 and parallel to the length direction of frame 14 in the most preferred form shown. A cable 62 is mounted around pulley 60 and includes first and second ends 64 and 66. Pulley 60 is located intermediate first and second ends 64 and 66 of cable 62. An attachment member 68 is connected to second end 66 of cable 62 and has cross sections perpendicular to cable 62. In the most preferred form shown, attachment member 68 includes a plate 70 having first and second sides 72 and 74 extending at non-parallel angles to cable 62. In the preferred form shown, first and second sides 72 and 74 are parallel and extend generally perpendicular to cable 62. A plurality of loops 76 is formed on first side 72, and a ring 78 is formed on second side 74. Second end 66 of cable 62 is attached to ring 78. Cable 62 passes through a passage 86 defined between attachment member 68 and pulley 60. Passage 86 has cross sections perpendicular to cable 62 and smaller than the cross sections of attachment member 68. A harness 80 has a first end 82 adapted to be connected to worker 100 and a second end 84 attached to one of loops 76. The number of loops 76 can be varied according to the teachings of the present invention depending upon the total amount of force that safety apparatus 10 can handle without moving off surface 102. The number of workers 100 should not exceed the number of loops 76.

According to the preferred form shown, safety apparatus 10 further includes a slide 90 slideably mounted to frame unit 12 along a slide axis 92 and movable between upper and lower positions. Slide axis 92 is at a non-parallel angle to and spaced from rotation axis 58. Furthermore, slide axis 92 is at a non-parallel angle A in a range of 60°-85° relative to surface 102. In the most preferred forms shown, angle A between slide axis 92 and surface 102 is in the order of 74°. Slide 90 slideably extends through slot 18 of frame 14 and includes upper and lower ends 94 and 96 spaced along slide axis 92. First end 64 of cable 62 is attached to upper end 94 of slide 90. Pulley 60 is located intermediate slide 90 and plate 70 in the width direction of frame 14. Furthermore, slide 90 includes U-shaped cross sections perpendicular to slide axis 92 and includes first and second arms 88 and a connecting wall 98 extending between first and second arms 88. Each of first and second arms 88 includes a bend 89 extending perpendicularly from a distal edge thereof. Pulley 60 extends intermediate first and second arms 88 in the length direction of frame unit 12.

According to the preferred form shown, safety apparatus 10 further includes a biasing member 110 mounted between slide 90 and frame unit 12 to bias slide 90 from the lower position to the upper position. In the most preferred form shown, biasing member 110 is in the form of a cylinder extending through slot 18 and having an upper end 112 fixed to a tab 56 located at upper end 94 of slide 90 and a lower end 114 fixed to frame unit 12 at a location intermediate pulley 60 and attachment member 68 in the width direction of frame 14. The cylinder can be of the pneumatic or hydraulic type. Furthermore, biasing member 110 can be of other forms and types according to the teachings of the present invention. As an example, basing member 110 can include a cushioning spring and a cushioning rod extending through the cushioning spring and attached between slide 90 and frame 14.

Rollers 26 support sliding movement of slide 90 between the upper and lower positions along slide axis 92 in a manner to reduce frictional interaction. In the most preferred form shown, some of rollers 26 are in contact with outer faces of bends 89 of slide 90, and the remaining rollers 26 are in contact with an outer face of connecting wall 98 of slide 90. Other provisions for slideably supporting slide 90 relative to frame unit 12 would be within the skill of the art.

According to the preferred form shown, safety apparatus 10 further includes an engaging member 120 mounted to slide 90 to move therewith. Engaging member 120 includes a base 122 mounted to lower end 96 of slide 90. Base 122 extends along slide axis 92 and includes a serrated bottom 124. Engaging member 120 further includes first and second spaced teeth 126 and 128 each extending from base 122. Each of first and second teeth 126 and 128 includes a first side 132 and a second side 134 secured to base 122 at a location above serrated bottom 124. Second side 134 of each first and second teeth 126 and 128 is intermediate first side 132 and slide 90 and is parallel to first side 132 in the most preferred form shown. Each of first and second teeth 126 and 128 further includes inner and outer surfaces 136 and 138 extending between first and second sides 132 and 134. A first spacing between first sides 132 of first and second teeth 126 and 128 is less than a second spacing between second sides 134 of first and second teeth 126 and 128. The first spacing can be 35%-50% of the second spacing. In the most preferred form shown, the first spacing is in the order of 43% of the second spacing.

According to the preferred form shown, each of first and second teeth 126 and 128 further includes top and bottom edges 140 and 142 extending between inner and outer surfaces 136 and 138 and between first and second sides 132 and 134. In the most preferred form shown, top edge 140 is perpendicular to first and second sides 132 and 134. Furthermore, bottom edge 142 of each of first and second teeth 126 and 128 is wedge-shaped and includes a tip 144 and has decreasing widths with increasing spacing from top edge 140. Serrated bottom 124 of base 122 is located intermediate second side 134 and tip 144 in the vertical direction. Bottom edge 142 of each of first and second teeth 126 and 128 includes first and second arcuate portions 146 and 148. First arcuate portion 146 extends from first side 132 to tip 144, and second arcuate portion 148 extends from tip 144 to second side 134 and has a radius smaller than that of first arcuate portion 146 by 7-15%. In the most preferred form shown, the radius of first arcuate portion 146 is larger than that of second arcuate portion 108 by about 9%. Thus, first tooth 126 is planar and at a first acute angle B in a range of 55°-75° relative to base 122, and second tooth 128 is planar and at a second acute angle C in a range of 55°-75° relative to base 122. In the most preferred form shown, each of first and second arcuate angles B and C is in the order of 66°. However, first and second acute angles B and C can be different and different from each other.

Figure 8:
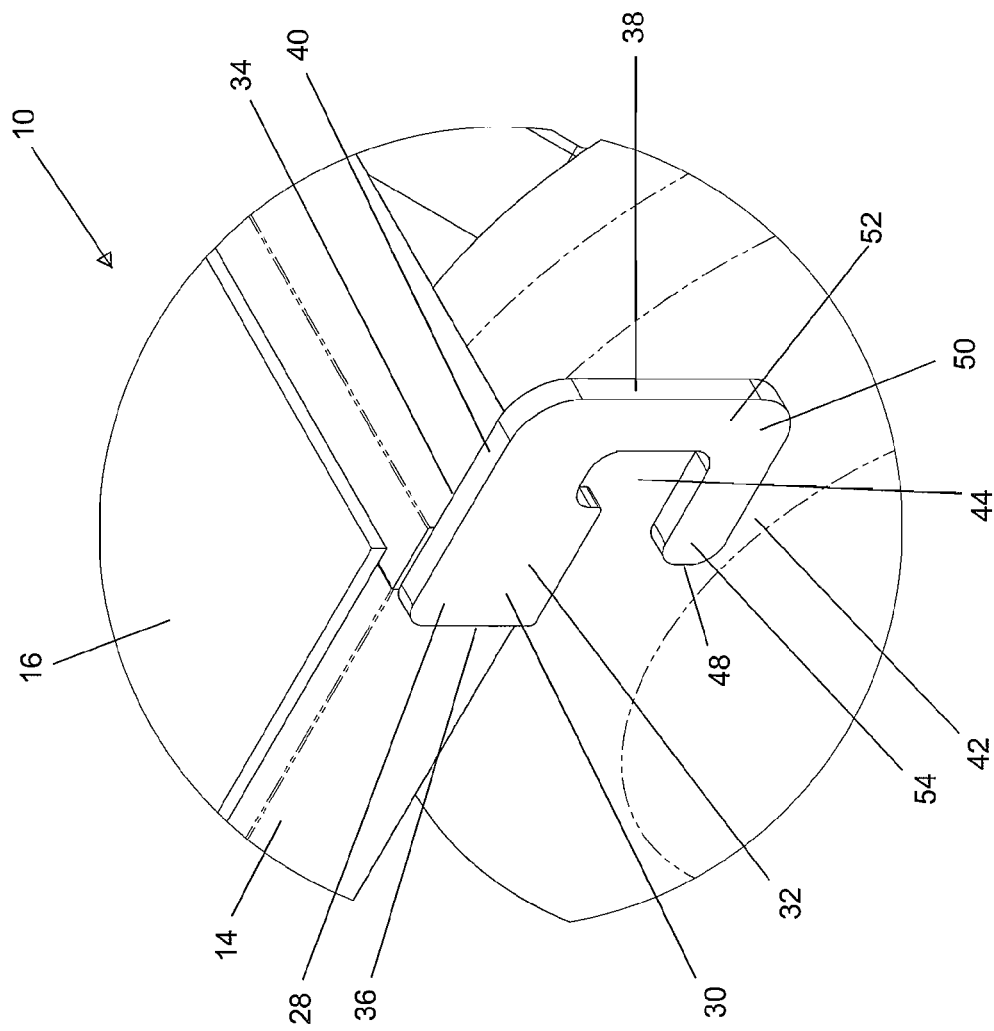
FIG. 8 shows an enlarged view of a portion of the safety apparatus of FIG. 1, illustrating detailed structure of an attachment element.
Figure 9:
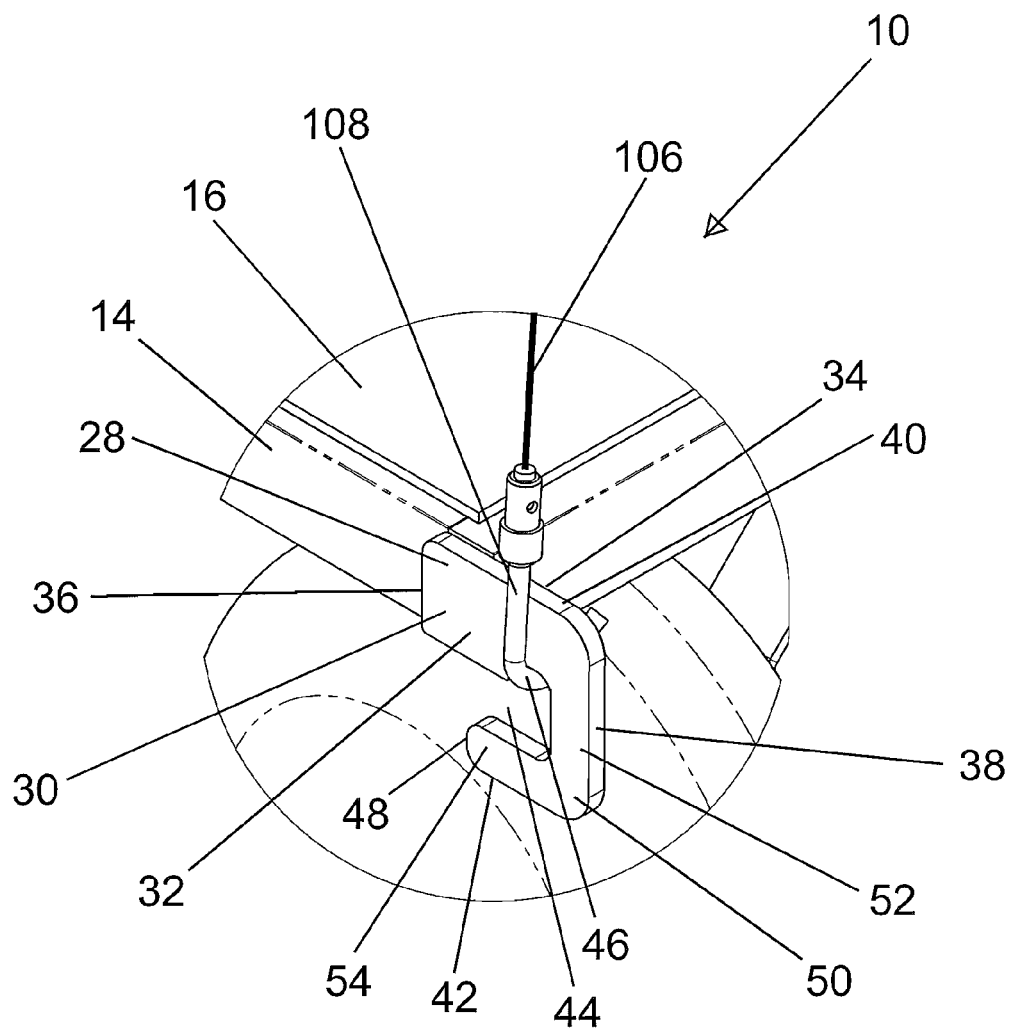
FIG. 9 shows a view similar to FIG. 8, with a hook engaged with the attachment element.

Now that the basic construction of safety apparatus 10 of the preferred teachings of the present invention has been explained, the operation and some of the advantages of safety apparatus 10 can be set forth and appreciated. In particular, for the sake of explanation, it will be assumed that slide 90 is in the upper position with engaging member 120 above surface 102 (FIG. 1). If worker 100 falls from surface 102, force resulting from falling of worker 100 is transmitted to slide 90 via harness 80 and cable 62. Pulley 60 rotates about rotation axis 58. Slide 90 is moved by cable 62 and slides from the upper position to the lower position (FIG. 8) along slide axis 92. First and second teeth 126 and 128 of engaging member 120 on slide 90 dig into and, thus, grip surface 102, preventing further falling of worker 100. Since engaging member 120 directly digs into surface 102 along slide axis 92 at non-perpendicular angle A relative to surface 102, first and second teeth 126 and 128 penetrate deeply into surface 102. Furthermore, since first and second teeth 126 and 128 are at acute angles B and C relative to base 122, penetration of first and second teeth 126 and 128 into surface 102 is enhanced. Thus, engaging member 120 is securely held in place without unintentional removal, reliably arresting worker 100. Wedge-shaped bottom edges 142 with tips 144 also assist in gripping of surface 102 by first and second teeth 126 and 128, further enhancing the arresting effect of falling worker 100. It can be appreciated that attachment member 68 abuts with passage 86 to limit movement of slide 90 under bias of biasing member 110 during operation of safety apparatus 10 according to the preferred teachings of the present invention.

Now that the basic teachings of the present invention have been explained, many extensions and variations will be obvious to one having ordinary skill in the art. For example, slide 90 and/or engaging member 20 can have different forms according to the teachings of the present invention. Specifically, engaging member 120 does not have to include base 122, first and second teeth 126 and 128 can directly extend from slide 90, slide 90 and/or engaging member 120 can have other constructions, or the like.

Although safety apparatus 10 in the preferred form shown includes lifting attachments 28 and is believed to produce synergistic results, lifting attachments 28 according to the teachings of the present invention can be utilized in other types of apparatus and equipment to avoid unintentional unhooking while being lifted to surface 102. Likewise, safety apparatus 10 according to the teachings of the present invention can include other types and forms of lifting attachments than shown.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A safety apparatus for arresting a fall of a worker from a surface, comprising, in combination:
    a frame unit adapted to be placed on the surface;
    a pulley rotatably mounted to the frame unit about a rotation axis spaced from the surface;
    a cable mounted around the pulley and including first and second ends, with the second end of the cable adapted to be connected to the worker, with the pulley located intermediate the first and second ends of the cable;
    a slide slideably mounted to the frame unit along a slide axis at a non-parallel angle to the rotation axis and movable between upper and lower positions, with the first end of the cable attached to the slide, with force resulting from the fall of the worker from the surface transmitted to the slide via the cable;
    a biasing member mounted between the slide and the frame unit, with the biasing member biasing the slide from the lower position to the upper position; and
    an engaging member mounted to the slide to move therewith, with the engaging member being above the surface when the slide is in the upper position, with the engaging member gripping the surface when the slide is in the lower position, preventing further falling of the worker.

2. The safety apparatus as claimed in claim 1, further comprising, in combination:
    an attachment member connected to the second end of the cable, with the attachment member having cross sections perpendicular to the cable; and
    a passage between the attachment member and the pulley, with the cable passing through the passage, with the passage having cross sections perpendicular to the cable and smaller than the cross sections of the attachment member, with the attachment member abutting with the passage limiting movement of the slide under bias of the biasing member.

3. The safety apparatus as claimed in claim 2, further comprising, in combination: a harness having a first end adapted to be connected to the worker and a second end, with the attachment member including a loop to which the second end of the harness is attached.

4. The safety apparatus as claimed in claim 3, with the attachment member including a plate having first and second sides extending at non-parallel angles to the cable, with the loop formed on the first side of the plate, with a ring formed on the second side of the plate, with the second end of the cable attached to the ring, with the pulley intermediate the slide and the plate.

5. The safety apparatus as claimed in claim 1, with the slide axis being at an angle in the order of 74° relative to the surface.

6. The safety apparatus as claimed in claim 1, with the biasing member including a cylinder having a lower end fixed to the frame unit, with the cylinder further including an upper end fixed to the slide.

7. The safety apparatus as claimed in claim 1, with the engaging member including first and second spaced teeth each extending from the slide, with each of the first and second teeth having a first side and a second side intermediate the first side and the slide, with each of the first and second teeth further including inner and outer surfaces extending between the first and second sides, with a first spacing between the first sides of first and second teeth being less than a second spacing between the second sides of the first and second teeth.

8. The safety apparatus as claimed in claim 7, with each of the first and second teeth further including top and bottom edges extending between the inner and outer surfaces and between the first and second sides, with the bottom edge of each of the first and second teeth being wedge-shaped and including a tip and having decreasing widths with increasing spacing from the top edge.

9. The safety apparatus as claimed in claim 8, with the bottom edge of each of the first and second teeth including first and second arcuate portions, with the first arcuate portion extending from the first side to the tip and having a first radius, with the second arcuate portion extending from the tip to the second side and having a second radius, with the first radius of the first arcuate portion having a radius larger than the second radius of the second arcuate portion.

10. The safety apparatus as claimed in claim 9, with the first and second sides of each of the first and second teeth being parallel to each other, with the top edge of each of the first and second teeth being perpendicular to the first and second sides.

11. The safety apparatus as claimed in claim 10, with the engaging member further including a base mounted to the slide and extending along the slide axis, with the base including a serrated bottom, with the second sides of the first and second teeth secured to the base, with the serrated bottom of the base intermediate the second side and the tip of the bottom edge of each of the first and second teeth.

12. The safety apparatus as claimed in claim 11, with the first tooth being planar and at a first acute angle relative to the base, with the second tooth being planar and at a second acute angle relative to the base.

13. The safety apparatus as claimed in claim 12, with each of the first and second arcuate angles being in the order of 66°.

14. The safety apparatus as claimed in claim 1, with the slide including U-shaped cross sections perpendicular to the slide axis, with the slide including first and second arms and a connecting wall extending between the first and second arms, with the pulley extending intermediate the first and second arms.

15. The safety apparatus as claimed in claim 14, with the frame unit including a plurality of rollers intermediate the pulley and an engagement point between the biasing member and the slide, with the plurality of rollers supporting sliding movement of the slide between the upper and lower positions along the slide axis.

16. The safety apparatus as claimed in claim 1, with the frame unit including a plurality of lifting attachments each including an attachment element comprising, in combination:
    first and second sides spaced in a first direction;
    first and second edges each extending between the first and second sides, with the first and second edges spaced in a second direction perpendicular to the first direction;
    third and fourth edges each extending between the first and second sides and between the first and second edges, with the third and fourth edges spaced in a third direction perpendicular to the first and second directions;

a first passage extending between the first and second sides in the first direction and extending from the first edge towards but spaced from the second edge in the second direction, with the first passage spaced from the third and fourth edges in the third direction; and a second passage extending between the first and second sides in the first direction and extending from the first passage towards but spaced from the third edge in the second direction, with the second passage spaced from the first, second, and fourth edges.

17. The safety apparatus as claimed in claim 16, with the attachment element further comprising, in combination: an extension extending between the first and second sides and extending from the first passage through the fourth edge in the third direction and extending from the first edge towards but spaced from the second edge in the second direction, with the second passage intermediate the extension and the second edge in the second direction, with the attachment element formed homogeneously from a same material and extending integrally between the first and second sides in the first direction, extending integrally between the first and second edges in the second direction and extending integrally between the third edge and the second passage in the third direction.

* * * * *